(12) United States Patent
Nakashima

(10) Patent No.: US 10,422,376 B2
(45) Date of Patent: Sep. 24, 2019

(54) THRUST ROLLER BEARING

(71) Applicant: JTEKT CORPORATION, Osaka-shi, Osaka (JP)

(72) Inventor: Yoshihito Nakashima, Kariya (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/964,329

(22) Filed: Apr. 27, 2018

(65) Prior Publication Data

US 2018/0328407 A1  Nov. 15, 2018

(30) Foreign Application Priority Data

May 12, 2017   (JP) ................. 2017-095774

(51) Int. Cl.
| | |
|---|---|
| *F16C 19/30* | (2006.01) |
| *F16C 33/46* | (2006.01) |
| *F16C 33/54* | (2006.01) |
| *F16C 33/64* | (2006.01) |
| *F16C 33/60* | (2006.01) |
| *F16C 33/62* | (2006.01) |
| *F16C 33/58* | (2006.01) |

(52) U.S. Cl.
CPC ........ *F16C 19/305* (2013.01); *F16C 33/4605* (2013.01); *F16C 33/546* (2013.01); *F16C 33/588* (2013.01); *F16C 33/60* (2013.01); *F16C 33/62* (2013.01); *F16C 33/64* (2013.01); *F16C 2202/04* (2013.01); *F16C 2204/60* (2013.01); *F16C 2220/40* (2013.01); *F16C 2223/16* (2013.01); *F16C 2361/65* (2013.01)

(58) Field of Classification Search
CPC ...... F16C 19/30; F16C 19/305; F16C 33/546; F16C 33/62; F16C 33/64; F16C 2202/04; F16C 2223/04; F16C 2223/08; F16C 2223/16
See application file for complete search history.

(56) References Cited

U.S. PATENT DOCUMENTS

| | | | | |
|---|---|---|---|---|
| 2004/0091192 | A1* | 5/2004 | Hayashi | ........... F16C 19/305 384/621 |
| 2005/0238275 | A1* | 10/2005 | Yoshiba | ........... F04B 27/1063 384/625 |
| 2008/0107369 | A1* | 5/2008 | Fujita | ........... F16C 33/34 384/463 |

FOREIGN PATENT DOCUMENTS

JP        2003-239981 A      8/2003

* cited by examiner

*Primary Examiner* — Phillip A Johnson
(74) *Attorney, Agent, or Firm* — Oliff PLC

(57) ABSTRACT

A thrust roller bearing includes rollers arranged in a radial manner, an annular cage that retains the rollers such that the rollers are rollable, an annular outer race located on one side of the cage in an axial direction of the cage and having a first raceway on which the rollers roll, and an annular inner race located on the other side of the cage in the axial direction and having a second raceway on which the rollers roll. At least one of the first raceway and the second raceway has a Vickers hardness that is greater than or equal to 800 and less than or equal to 950. The outer circumferential surface of each of the rollers has a Vickers hardness that is greater than or equal to 697 and less than 800.

3 Claims, 5 Drawing Sheets

THRUST ROLLER BEARING

INCORPORATION BY REFERENCE

The disclosure of Japanese Patent Application No. 2017-095774 filed on May 12, 2017 including the specification, drawings and abstract, is incorporated herein by reference in its entirety.

BACKGROUND OF THE INVENTION

1. Field of the Invention

The invention relates to a thrust roller bearing.

2. Description of Related Art

Thrust roller bearings are widely used in various fields. The thrust roller bearing supports a rotating member while receiving an axial thrust force. The thrust roller bearing has cylindrical rollers that are arranged in a radial manner. The thrust roller bearing is placed between a non-rotating member and a rotating member in, for example, vehicle automatic transmissions, and smooths rotation of the rotating member while receiving a thrust force in the direction of the axis of rotation.

The thrust roller bearing has an annular cage and a pair of raceway members (i.e., races). The cage retains the radially arranged rollers such that the rollers are rollable. The pair of raceway members sandwich the cage in the axial direction and have raceways on which the rollers roll.

In a thrust roller bearing disclosed in Japanese Patent Application Publication No. 2003-239981 (JP 2003-239981 A), surfaces of rollers are hardened by shot peening after heat treatment.

The present inventor has ascertained that depending on operating conditions, thrust roller bearings tend to suffer from so-called "flaking". The flaking is a phenomenon where a surface flakes off and that occurs, in particular, at raceways of races. Specifically, thrust roller bearings have such a structure that two opposite ends of each roller in the radial direction of races have different rolling distances. Thus, it is likely that rollers slip on raceways and exert load on races during operation of thrust roller bearings. This probably causes the flaking.

Therefore, depending on operating conditions, increasing the surface hardness of rollers as disclosed in JP 2003-239981 A may fail to provide enough durability and fail to increase the life of thrust roller bearings.

SUMMARY OF THE INVENTION

A propose of the invention is to provide a thrust roller bearing having a longer life.

An aspect of the invention provides a thrust roller bearing including the following: multiple rollers arranged in a radial manner; a cage that retains the rollers such that the rollers are rollable; an annular outer race located on one side of the cage in an axial direction of the cage and having a first raceway on which the rollers roll; and an annular inner race located on the other side of the cage in the axial direction and having a second raceway on which the rollers roll. At least one of the first raceway and the second raceway has a Vickers hardness that is greater than or equal to 800 and less than or equal to 950. The outer circumferential surface of each of the rollers has a Vickers hardness that is greater than or equal to 697 and less than 800.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

An embodiment of the invention is described with reference to FIGS. 1A through 6. While the invention will be described in conjunction with a specific embodiment that illustrates various preferred technical features, it is to be understood that the embodiment is not intended to limit the invention.

Figure 1A:
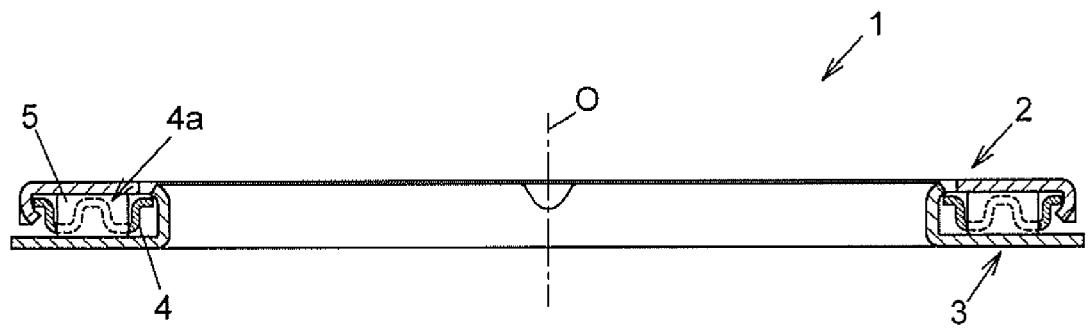
FIG. 1A is a cross-sectional view of a thrust roller bearing according to an embodiment of the invention, taken along a plane including the axis of rotation.
Figure 1B:
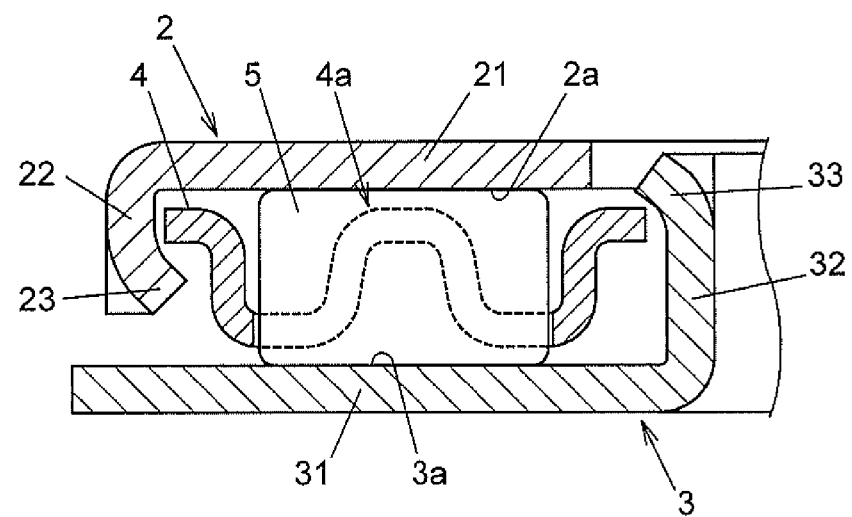
FIG. 1B is a partial enlarged view of FIG. 1A.

FIG. 1A is a cross-sectional view of a thrust roller bearing 1 according to the embodiment, taken along a plane including an axis O of rotation of an annular cage 4. FIG. 1B is a partial enlarged view of FIG. 1A.

The thrust roller bearing 1 includes multiple cylindrical rollers 5, the cage 4, an outer race 2, and an inner race 3. The cylindrical rollers 5 are arranged in a radial manner. The cage 4 retains the rollers 5 such that the rollers 5 are rollable. The outer race 2 is located on one side of the cage 4 in the axial direction and has a first raceway 2a on which the rollers 5 roll. The outer race 2 corresponds to an annular first raceway member. The inner race 3 is located on the other side of the cage 4 in the axial direction and has a second raceway 3a on which the rollers 5 roll. The inner race 3 corresponds to an annular second raceway member.

The thrust roller bearing 1 is used in, for example, vehicle automatic transmissions. The thrust roller bearing 1 is fitted between a shaftlike rotating member inserted through an opening defined by the inner circumference of the inner race 3, and a supporting portion of a housing that faces the outer race 2. The thrust roller bearing 1 smooths rotation of the rotating member by the rolling of the rollers 5 that are retained by the cage 4, while receiving a thrust force in the axial direction.

Figure 2:
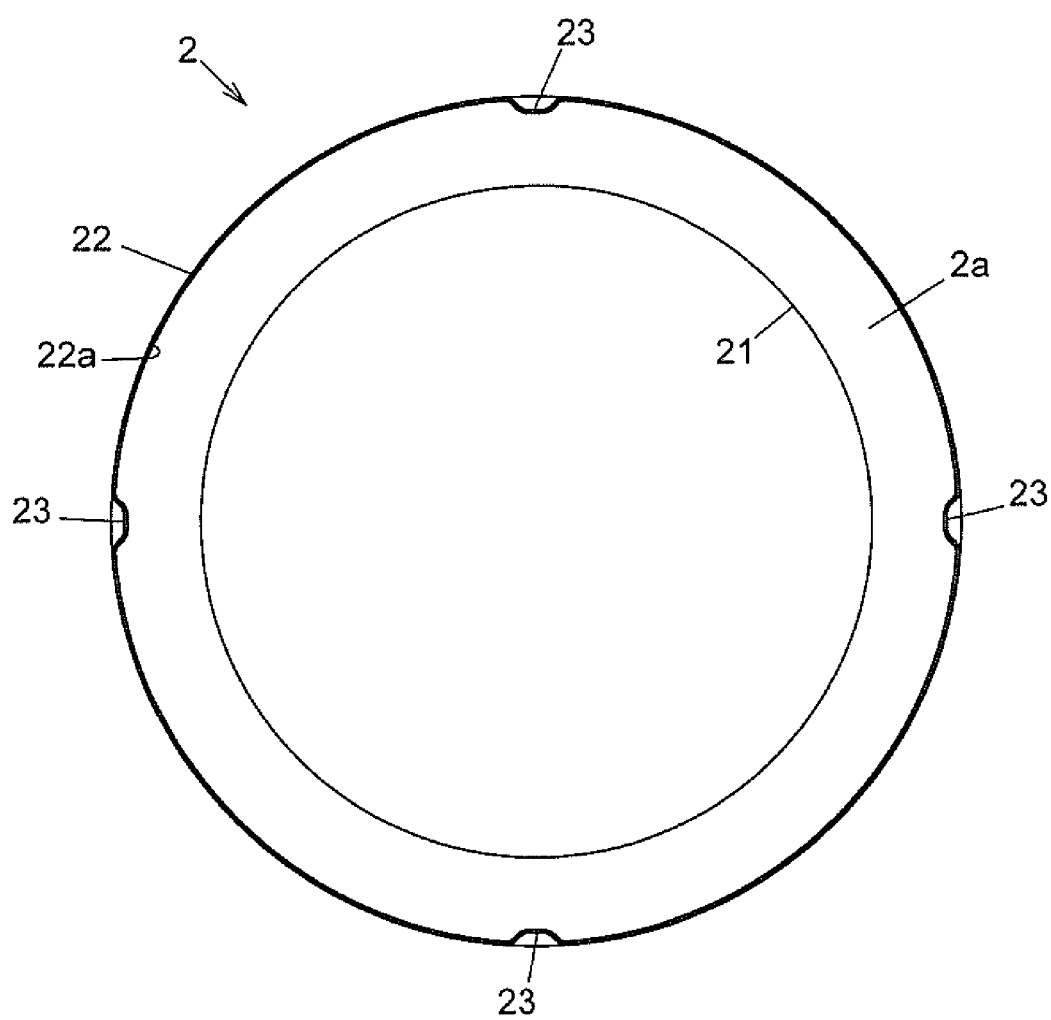
FIG. 2 is a plan view of an outer race viewed from an inner race side.

FIG. 2 is a plan view of the outer race 2 viewed from the inner race 3 side.

The outer race 2 is made of metal and may be made from steel sheet or plates. The outer race 2 is a one-piece member including an annular first raceway portion 21, a short cylindrical outer wall portion 22, and multiple catch protrusions 23. The first raceway portion 21 has the first raceway 2a on which the rollers 5 roll. The outer wall portion 22 extends from an outer edge of the first raceway portion 21 in a direction perpendicular to the first raceway 2a. The catch protrusions 23 are located at a tip end of the outer wall portion 22 (opposite to a base end of the outer wall portion 22 that is connected to the first raceway 2a). The first raceway 2a lies on a plane perpendicular to the rotation axis O and faces the second raceway 3a of the inner race 3 described later.

The catch protrusions 23 are provided at different locations on the outer edge of the outer race 2 and protrude radially inward from an inner circumferential surface 22a of the outer wall portion 22. The catch protrusions 23 catch the cage 4 to limit movement of the cage 4 in a direction away from the first raceway 2a. The catch protrusions 23 are formed by bending inward the tip end of the outer wall portion 22 by, for example, staking (crimping).

According to the embodiment, four catch protrusions 23 are arranged at regular intervals (at intervals of 90 degrees) in a circumferential direction of the outer race 2. The number of the catch protrusions 23 may be other than four. When the cage 4 moves relative to the outer race 2 in the direction away from the first raceway 2a, an outer edge of the cage 4 comes into abutment against the catch protrusions 23 so that further axial movement of the cage 4 relative to the outer race 2 is suppressed.

Figure 3:
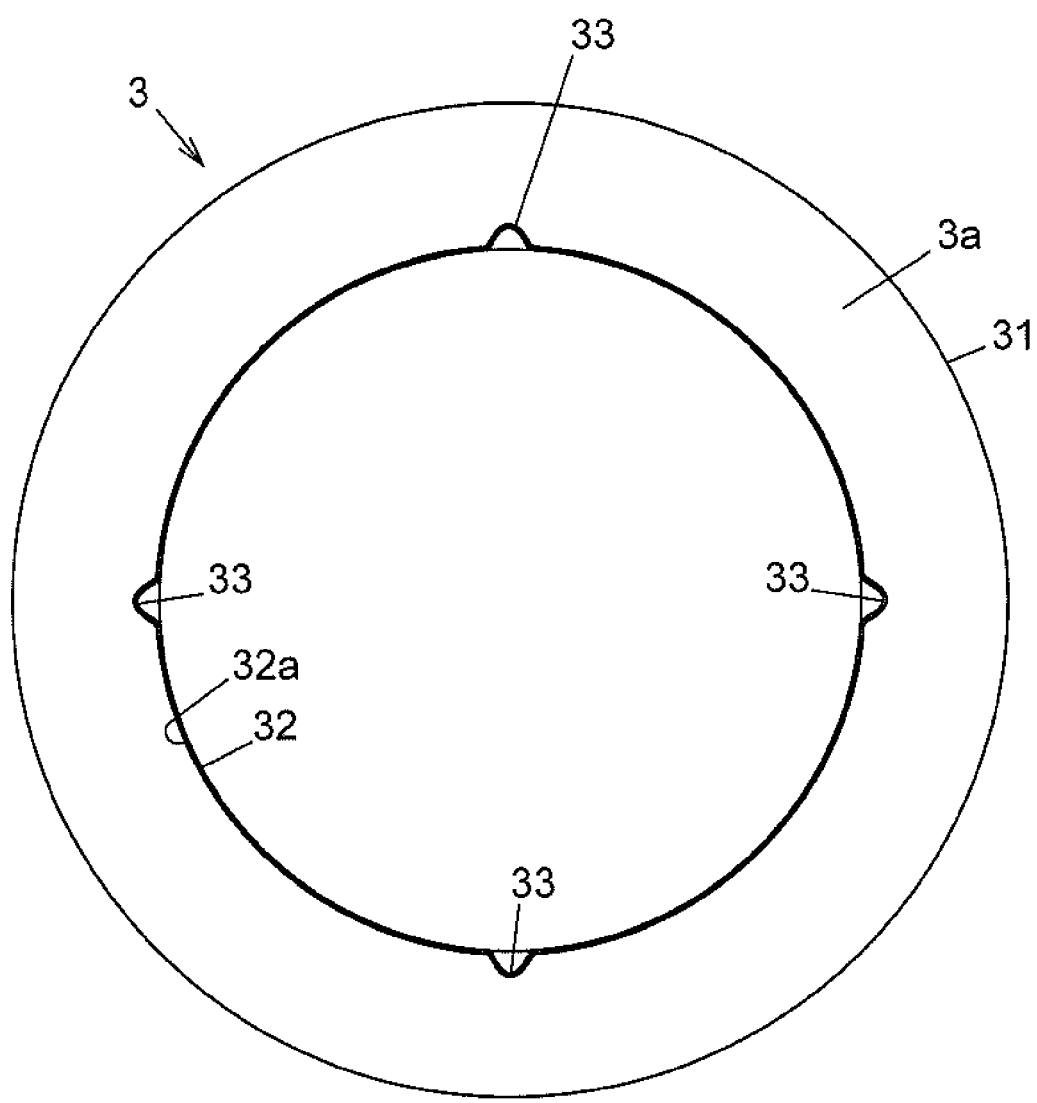
FIG. 3 is a plan view of an inner race viewed from an outer race side.

FIG. 3 is a plan view of the inner race 3 viewed from the outer race 2 side.

The inner race 3 is made of metal and may be made from steel sheets or plates. The inner race 3 is a one-piece member including an annular second raceway portion 31, a short cylindrical inner wall portion 32, and multiple catch protrusions 33. The second raceway portion 31 has the second raceway 3a on which the rollers 5 roll. The inner wall portion 32 extends from an inner edge of the second raceway portion 31 in a direction perpendicular to the second raceway 3a. The catch protrusions 33 are located at a tip end of the inner wall portion 32 (opposite to a base end of the inner wall portion 32 that is connected to the second raceway 3a). The second raceway 3a is parallel to the first raceway 2a of the outer race 2.

The catch protrusions 33 are provided at different locations on the inner edge of the inner race 3 and protrude radially outward from an outer circumferential surface 32a of the inner wall portion 32. The catch protrusions 33 catch the cage 4 to limit movement of the cage 4 in a direction away from the second raceway 3a. The catch protrusions 33 are formed by bending outward the tip end of the inner wall portion 32 by, for example, staking (crimping).

According to the embodiment, four catch protrusions 33 are arranged at regular intervals (at intervals of 90 degrees) in a circumferential direction of the inner race 3. When the cage 4 moves relative to the inner race 3 in the direction away from the second raceway 3a, an inner edge of the cage 4 comes into abutment against the catch protrusions 33 so that further axial movement of the cage 4 relative to the inner race 3 is suppressed.

Figure 4:
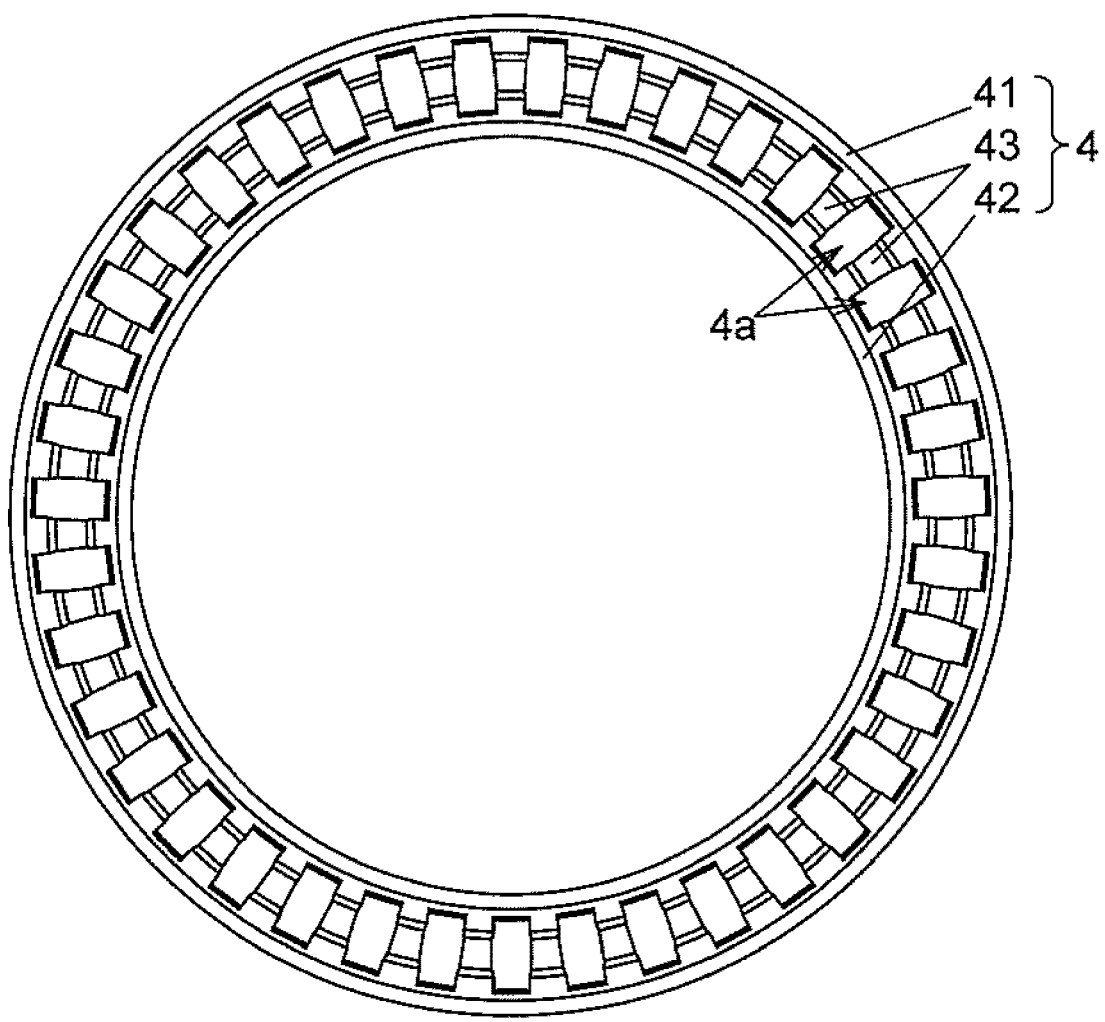
FIG. 4 is a plan view of a cage viewed from an inner race side.

FIG. 4 is a plan view of the cage 4 viewed from the inner race 3 side.

The cage 4 is a one-piece member including an outer annular portion 41, an inner annular portion 42, and multiple cage bars 43. The outer annular portion 41 is located radially outside multiple retaining holes 4a that retain the rollers 5. The inner annular portion 42 is located radially inside the retaining holes 4a. The cage bars 43 extend radially to connect the outer annular portion 41 and the inner annular portion 42. The outer annular portion 41 and the inner annular portion 42 are concentric with each other and define, in combination with the cage bars 43, the retaining holes 4a. Each of the retaining holes 4a penetrates the cage 4 in the thickness direction of the cage 4 (i.e., in the axial direction) and has a rectangular shape with long sides extending in the radial direction of the cage 4.

As many retaining holes 4a as the rollers 5 (in the embodiment, 39 retaining holes 4a) are formed in the cage 4 in a radial manner and retain the rollers 5 such that the radially-arranged rollers 5 are rollable. According to the embodiment, the cage 4 is formed by stamping and bending steel sheets or plates, for example, by press working. When the cage 4 is viewed in the axial direction, a distance between the centers of adjacent ones of the retaining holes 4a in the circumferential direction of the cage 4 is less than the circumference of an outer circumferential surface, as a rolling surface, of each of the rollers 5.

A common approach to increasing the life of the thrust roller bearing 1 is to increase the hardness of the rollers 5. In contrast, according to the embodiment, to increase the life of the thrust roller bearing 1, the first and second raceways 2a and 3a of the outer and inner races 2 and 3 are hardened to a hardness greater than the hardness of the outer circumferential surfaces of the rollers 5.

Specifically, in the thrust roller bearing 1 according to the embodiment, each of the first raceway 2a and the second raceway 3a has a Vickers hardness that is greater than or equal to 800 and less than or equal to 950, whereas the outer circumferential surface of each of the rollers 5 has a Vickers hardness that is greater than or equal to 697 and less than 800. However, as long as one of the first raceway 2a and the second raceway 3a has a Vickers hardness that is greater than or equal to 800 and less than or equal to 950, the thrust roller bearing 1 is expected to have a long life, compared to a related-art thrust roller bearing that use rollers having a Vickers hardness greater than the Vickers hardness of a pair of races. A Vickers hardness that is greater than or equal to 800 and less than or equal to 950 is equivalent to a Rockwell hardness that is greater than or equal to 64.0 and less than or equal to 68.2, and a Vickers hardness that is greater than or equal to 697 and less than 800 is equivalent to a Rockwell hardness that is greater than or equal to 60.0 and less than 64.0. The outer and inner races 2 and 3 are hereinafter referred to respectively as the races 2 and 3, and the first and second raceways 2a and 3a are hereinafter referred to respectively as the raceways 2a and 3a.

According to the embodiments, the surfaces of the first and second raceways 2a and 3a are hardened by shot peening. Shots used in the shot peening process may be preferably made of iron. When the shots are made of glass, fragments of glass may be left in the raceways 2a and 3a. For this reason, it is not preferable that the shots be made of glass.

The shot peening process may be applied to only the raceways 2a and 3a of the races 2 and 3. Alternatively, the shot peening process may be applied to the entire surfaces of the races 2 and 3. The parameters (shot pressure, shot diameter, etc.) of the shot peening process are not limited to specific conditions. However, insufficient shot peening may fail to provide enough hardness whereas excessive shot peening may degrade toughness. When a layer hardened by the shot peening process is too thick, the overall toughness of the races 2 and 3 may be degraded, and the life of the thrust roller bearing 1 may be degraded accordingly. In view of the above, the parameters of the shot peening process are set appropriately such that the raceways 2a and 3a have a peak value of a residual compressive stress at a depth less than 15 micrometers (μm) from their respective surfaces and such that the peak value of the residual compressive stress is greater than or equal to 750 megapascals (MPa) and less than or equal to 2000 MPa. The residual compressive stress is measurable by X-ray stress measurement.

Figure 5:
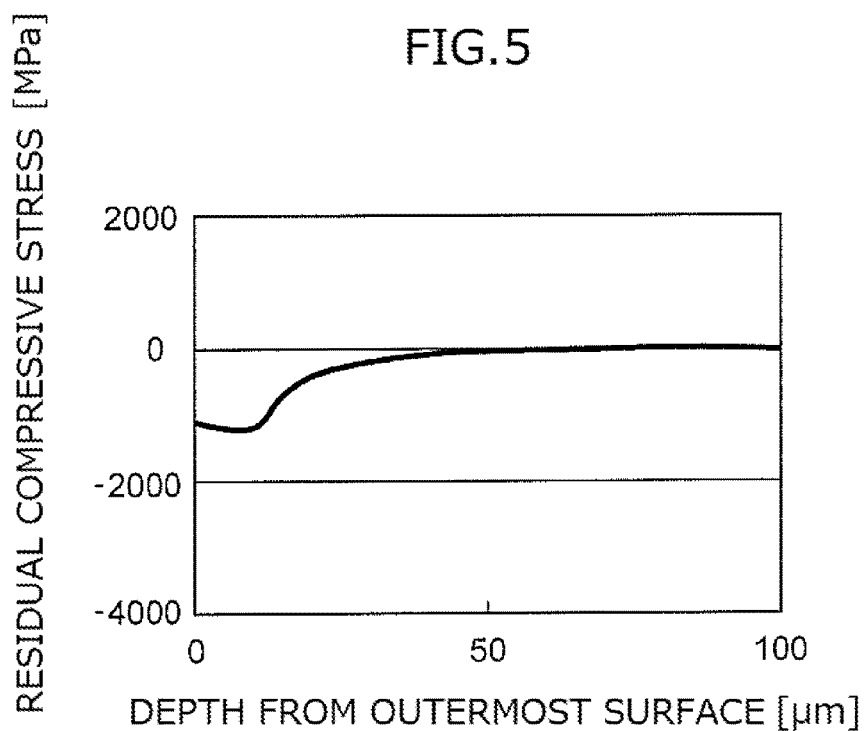
FIG. 5 is a graph diagram illustrating a relationship between a depth from a raceway surface and a residual compressive stress.

FIG. 5 is a graph diagram illustrating a relationship between a residual compressive stress and a depth from the surface of each of the raceways 2a and 3a of the races 2 and 3. FIG. 5 shows an average residual compressive stress among ten samples that have undergone the shot peening process. As can be seen from FIG. 5, a layer hardened by the shot peening process is very thin, and the residual compressive stress peaks at a depth less than 15 μm from the surface of each of the raceways 2a and 3a.

Incidentally, using a hard material for the races 2 and 3 may ensure enough hardness of the raceways 2a and 3a. However, this approach may make it difficult to machine the catch protrusions 23 and 33 and may cause cracks when the outer wall portion 22 and the inner wall portion 32 are bent in the manufacturing process. In contrast, according to the embodiment, the surfaces of the raceways 2a and 3a are hardened by the shot peening process. This approach facilitates machining the catch protrusions 23 and 33 and increases the hardness of the surfaces of the raceways 2a and 3a so as to reduce the occurrence of flaking.

According to the embodiment, before the races 2 and 3 undergo the shot peening process, the surfaces of the races 2 and 3 have a Vickers hardness that is greater than or equal to 675 and less than or equal to 775 (equivalent to a Rockwell hardness that is greater than or equal to 59 and less than or equal to 63). The material of the races 2 and 3 may be SAE1075 steel, SK85 steel, or any other suitable steel. The surfaces of the raceways 2a and 3a may be hardened by methods other than shot peening. For example, burnishing may be used to harden the surfaces of the raceways 2a and 3a.

The races 2 and 3 are formed by press working and then undergo heat treatment. After that, the raceways 2a and 3a are shot peened. A Micro-Vickers hardness test with a test force of 1.94 newtons (N) is used to measure the Vickers hardness of the surfaces of the raceways 2a and 3a. The reason for using this test is that since a layer hardened by shot peening is very thin, applying a large test force may break the hardened layer.

The surfaces of the rollers 5 are hardened to a Vickers hardness that is greater than or equal to 697 and less than 800 for the following reasons. When the surfaces of the rollers 5 have a Vickers hardness less than 697, flaking is likely to occur at the surfaces of the rollers 5. On the other hand, special processing is required to harden the surfaces of the rollers 5 to a Vickers hardness that is greater than or equal to 800. The special processing probably complicates the manufacturing process and increases the manufacturing cost.

The rollers 5 may be made from a conventional quenched and tempered material. Preferably, the rollers 5 are made from a carbonitrided, quenched and tempered material, which has a greater hardness than a conventional quenched and tempered material. It is preferable that the outer circumferential surface of each of the rollers 5 contains nitrogen with a concentration that is greater than or equal to 0.01 mass % and less than or equal to 1.00 mass %. Using a carbonitrided, quenched and tempered material for the rollers 5 allows the thrust roller bearing 1 to have a still longer life.

Figure 6:
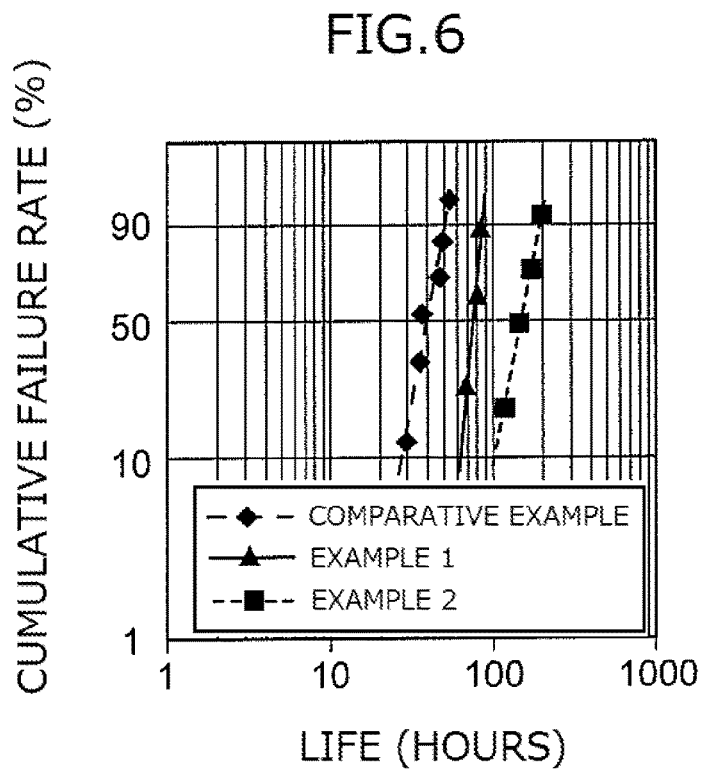
FIG. 6 is a graph diagram illustrating relationships between a cumulative failure rate and a life in examples according to the embodiment and a comparative example.

FIG. 6 is a graph diagram illustrating a result of an experiment conducted to determine the relationships between a cumulative failure rate and a life in Example 1 according to the embodiment, Example 2 according to the embodiment, and a comparative example. The races 2 and 3 used in Example 1 are shot peened, and the rollers 5 used in Example 1 are made from a conventional quenched and tempered material. The races 2 and 3 used in Example 2 are shot peened, and the rollers 5 used in Example 2 are made from a carbonitrided, quenched and tempered material. The races 2 and 3 used in the comparative example are not shot peened, and the rollers 5 used in the comparative example are made from a conventional quenched and tempered material. As can be seen from FIG. 6, Examples 1 and 2 each have a longer life than the comparative example, and Example 2, which uses the rollers 5 made from a carbonitrided, quenched and tempered material, has the longest life.

As described above, according to the embodiment, the Vickers hardness of the outer circumferential surface of each of the rollers 5 is less than the Vickers hardness of each of the raceways 2a and 3a of the races 2 and 3. This feature reduces the occurrence of flaking at the raceways 2a and 3a, thus increasing the life of the thrust roller bearing 1 as demonstrated by the above experiment result. According to the embodiment, the surface of each of the first raceway 2a and the second raceway 3a has a Vickers hardness that is greater than or equal to 800 and less than or equal to 950, and the outer circumferential surface of each of the rollers 5 has a Vickers hardness that is greater than or equal to 697 and less than 800. This feature facilitates manufacturing the thrust roller bearing 1 while reliably achieving the advantageous effect described above.

Hardening the outer circumferential surfaces of the rollers 5 to a Vickers hardness that is less than the Vickers hardness of the raceways 2a and 3a makes it likely that the outer circumferential surfaces of the rollers 5 are subjected to load. However, a portion of each of the rollers 5 to which the load is applied changes continuously while the rollers 5 are rolling. Thus, wear and the occurrence of flaking are reduced.

While the invention has been described with reference to a specific embodiment, it is to be understood that the invention is not limited to the embodiment. It is not essential that all the features described in the embodiment be combined to carry out the invention.

The embodiment may be modified in various ways within the scope of the invention. According to the embodiment, each of the first raceway 2a and the second raceway 3a has a Vickers hardness that is greater than or equal to 800 and less than or equal to 950. Alternatively, only one of the first raceway 2a and the second raceway 3a may have a Vickers hardness that is greater than or equal to 800 and less than or equal to 950. In other words, hardening at least one of the first and second raceways 2a and 3a to a Vickers hardness that is greater than or equal to 800 and less than or equal to 950 achieves the advantageous effect of the invention. In this case, it is preferable that the at least one of the first and second raceways 2a and 3a, which has a Vickers hardness that is greater than or equal to 800 and less than or equal to 950, has a peak value of a residual compressive stress at a depth less than 15 μm from the surface of the at least one of the first and second raceways 2a and 3a, and that the peak value of the residual compressive stress be greater than or equal to 750 MPa and less than or equal to 2000 MPa.

The invention makes it possible to provide a thrust roller bearing having a longer life.

What is claimed is:
1. A thrust roller bearing comprising:
 a plurality of rollers arranged in a radial manner;

a cage that retains the plurality of rollers such that the plurality of rollers are rollable;

an annular first raceway member located on one side of the cage in an axial direction of the cage and having a first raceway on which the plurality of rollers roll; and an annular second raceway member located on the other side of the cage in the axial direction and having a second raceway on which the plurality of rollers roll, wherein at least one of the first raceway and the second raceway has a Vickers hardness that is greater than or equal to 800 and less than or equal to 950, an outer circumferential surface of each of the plurality of rollers has a Vickers hardness that is greater than or equal to 697 and less than 800, the at least one of the first raceway and the second raceway has a peak value of a residual compressive stress at a depth less than 15 µm from a surface of the at least one of the first raceway and the second raceway, and the peak value of the residual compressive stress is greater than or equal to 750 MPa and less than or equal to 2000 MPa.

2. The thrust roller bearing according to claim 1, wherein the outer circumferential surface of each of the plurality of rollers contains nitrogen with a concentration that is greater than or equal to 0.01 mass % and less than or equal to 1.00 mass %.

3. The thrust roller bearing according to claim 1, wherein at least one of the annular first raceway member and the annular second raceway member is hardened by a shot peening process.

* * * * *